US012602915B2

(12) United States Patent
Ravi Kumar et al.

(10) Patent No.:  US 12,602,915 B2
(45) Date of Patent:       Apr. 14, 2026

(54) FEATURE FUSION FOR NEAR FIELD AND FAR FIELD IMAGES FOR VEHICLE APPLICATIONS

(71) Applicant: QUALCOMM Incorporated, San Diego, CA (US)

(72) Inventors: Varun Ravi Kumar, San Diego, CA (US); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 18/313,287

(22) Filed: May 5, 2023

(65) Prior Publication Data

US 2024/0371147 A1     Nov. 7, 2024

(51) Int. Cl.
*G06V 10/77*          (2022.01)
*G06V 10/80*          (2022.01)
*G06V 20/56*          (2022.01)

(52) U.S. Cl.
CPC ........ *G06V 10/806* (2022.01); *G06V 10/7715* (2022.01); *G06V 20/56* (2022.01)

(58) Field of Classification Search
CPC ............. G06V 10/806; G06V 10/7715; G06V 10/764; G06V 10/82; G06V 20/56; G06F 18/253
See application file for complete search history.

(56) References Cited

U.S. PATENT DOCUMENTS

| | | | |
|---|---|---|---|
| 11,921,824 B1 * | 3/2024 | Hester | G06N 3/045 |
| 2013/0103257 A1 * | 4/2013 | Almedia | B60Q 1/303 |
| | | | 701/36 |

| | | | |
|---|---|---|---|
| 2020/0025931 A1 * | 1/2020 | Liang | G06F 18/251 |
| 2021/0064913 A1 | 3/2021 | Ko et al. | |
| 2021/0182596 A1 | 6/2021 | Adams et al. | |
| 2021/0406674 A1 | 12/2021 | Wu et al. | |
| 2022/0114807 A1 | 4/2022 | Iancu et al. | |

(Continued)

OTHER PUBLICATIONS

Wu et al., HSTA: A Hierarchical Spatio-Temporal Attention Model for Trajectory Prediction, 2021, IEEE Transactions on Vehicular Technology 70(11); 11295-11307. (Year: 2021).*

(Continued)

*Primary Examiner* — Kathleen M Broughton

(74) *Attorney, Agent, or Firm* — Norton Rose Fulbright US LLP/QUALCOMM Incorporated

(57)          ABSTRACT

This disclosure provides systems, methods, and devices for vehicle driving assistance systems that support image processing. In a first aspect, a method of fusing features from near-field images and far-field images is provided that includes determining feature vectors and spatial locations for received images from near-field and far-field image sensors. A first set of weighted feature vectors may be determined based on spatial locations of the features and a second set of weighted feature vectors may be determined based on corresponding features between the feature vectors. Fused feature vectors may then be determined based on the weighted feature vectors, such as using a transformer attention process trained to select and combine features from both sets of weighted feature vectors. Vehicle control instructions may be determined based on the fused feature vectors. Other aspects and features are also claimed and described.

30 Claims, 6 Drawing Sheets

(56)     References Cited

U.S. PATENT DOCUMENTS

2022/0261590 A1*   8/2022  Brahma ................. G06V 20/56
2022/0351526 A1   11/2022  Bar Zvi et al.
2022/0358328 A1*  11/2022  Wu .......................... G06T 7/73
2023/0213643 A1*   7/2023  Hwang .................... G06T 7/50
                                                                   382/106

OTHER PUBLICATIONS

Su et al., Pixel-Adaptive Convolutional Neural Networks, 2019, arXiv:1904.05373v1, pp. 1-13. (Year: 2019).*
Xu et al., ACDet: Attentive Cross-view Fusion for LiDAR-based 3D Object Detection, 2022, International Conference on 3D Vision, pp. 1-11. (Year: 2022).*
Sharath et al., A dynamic two-dimensional (D2D) weight-based map-matching algorithm, Transportation Research Part C 98 (2019): 409-432. (Year: 2018).*
International Search Report and Written Opinion—PCT/US2024/017687—ISA/EPO—Jun. 6, 2024.

* cited by examiner

600

RECEIVE A FIRST PLURALITY OF IMAGES CAPTURED BY NEAR-FIELD IMAGE SENSORS AND A SECOND PLURALITY OF IMAGES CAPTURED BY FAR-FIELD IMAGE SENSORS
602

DETERMINE A FIRST SET OF FEATURE VECTORS FOR THE FIRST PLURALITY OF IMAGES AND A SECOND SET OF FEATURE VECTORS FROM THE SECOND PLURALITY OF IMAGES
604

DETERMINE A FIRST SET OF WEIGHTED FEATURE VECTORS BASED ON SPATIAL LOCATIONS FOR FEATURES FROM THE FIRST SET OF FEATURE VECTORS AND THE SECOND SET OF FEATURE VECTORS
606

DETERMINE A SECOND SET OF WEIGHTED FEATURE VECTORS BASED ON CORRESPONDING FEATURES BETWEEN THE FIRST SET OF FEATURE VECTORS AND THE SECOND SET OF FEATURE VECTORS
608

DETERMINE FUSED FEATURE VECTORS BASED ON THE FIRST SET OF WEIGHTED FEATURE VECTORS AND THE SECOND SET OF WEIGHTED FEATURE VECTORS
610

DETERMINE VEHICLE CONTROL INSTRUCTIONS BASED ON THE FUSED FEATURE VECTORS.
612

*FIG. 6*

FEATURE FUSION FOR NEAR FIELD AND FAR FIELD IMAGES FOR VEHICLE APPLICATIONS

TECHNICAL FIELD

Aspects of the present disclosure relate generally to driver-operated or driver-assisted vehicles, and more particularly, to methods and systems suitable for processing images for use in supplying driving assistance or for autonomous driving.

INTRODUCTION

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, and using an electronic device, etc. Sometimes circumstances create situations that even attentive drivers are unable to identify in time to prevent vehicular collisions. Aspects of this disclosure, provide improved systems for assisting drivers in vehicles with enhanced situational awareness when driving on a road.

One aspect includes a method for image processing for use in a vehicle assistance system that includes receiving a first plurality of images captured by near-field image sensors and a second plurality of images captured by far-field image sensors. The method also includes determining a first set of feature vectors for the first plurality of images and a second set of feature vectors from the second plurality of images. The method also includes determining a first set of weighted feature vectors based on spatial locations for features from the first set of feature vectors and the second set of feature vectors. The method also includes determining a second set of weighted feature vectors based on corresponding features between the first set of feature vectors and the second set of feature vectors. The method also includes determining fused feature vectors based on the first set of weighted feature vectors and the second set of weighted feature vectors. The method also includes determining vehicle control instructions for a vehicle based on the fused feature vectors.

An additional includes an apparatus that includes a memory storing processor-readable code and at least one processor coupled to the memory. The at least one processor may be configured to execute the processor-readable code to cause the at least one processor to perform operations including receiving a first plurality of images captured by near-field image sensors and a second plurality of images captured by far-field image sensors. The operations also include determining a first set of feature vectors for the first plurality of images and a second set of feature vectors from the second plurality of images. The operations also include determining a first set of weighted feature vectors based on spatial locations for features from the first set of feature vectors and the second set of feature vectors. The operations also include determining a second set of weighted feature vectors based on corresponding features between the first set of feature vectors and the second set of feature vectors. The operations also include determining fused feature vectors based on the first set of weighted feature vectors and the second set of weighted feature vectors. The operations also include determining vehicle control instructions for a vehicle based on the fused feature vectors.

Another aspect includes a non-transitory computer-readable medium storing instructions that, when executed by a processor, cause the processor to perform operations including receiving a first plurality of images captured by near-field image sensors and a second plurality of images captured by far-field image sensors. The operations also include determining a first set of feature vectors for the first plurality of images and a second set of feature vectors from the second plurality of images. The operations also include determining a first set of weighted feature vectors based on spatial locations for features from the first set of feature vectors and the second set of feature vectors. The operations also include determining a second set of weighted feature vectors based on corresponding features between the first set of feature vectors and the second set of feature vectors. The operations also include determining fused feature vectors based on the first set of weighted feature vectors and the second set of weighted feature vectors. The operations also include determining vehicle control instructions for a vehicle based on the fused feature vectors.

A further aspect includes a vehicle that includes near-field image sensors and far-field image sensors. The vehicle also includes a memory storing processor-readable code and at least one processor coupled to the memory. The at least one processor configured to execute the processor-readable code to cause the at least one processor to perform operations including receiving a first plurality of images captured by near-field image sensors and a second plurality of images captured by far-field image sensors. The operations also include determining a first set of feature vectors for the first plurality of images and a second set of feature vectors from the second plurality of images. The operations also include determining a first set of weighted feature vectors based on spatial locations for features from the first set of feature vectors and the second set of feature vectors. The operations also include determining a second set of weighted feature vectors based on corresponding features between the first set of feature vectors and the second set of feature vectors. The operations also include determining fused feature vectors based on the first set of weighted feature vectors and the second set of weighted feature vectors. The operations also include determining vehicle control instructions for a vehicle based on the fused feature vectors.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) ng networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified, air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1. 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a flow chart illustrating an example method for feature fusion for near field and far field images.

Like reference numbers and designations in the various drawings indicate like elements.

DETAILED DESCRIPTION

Figure 1:
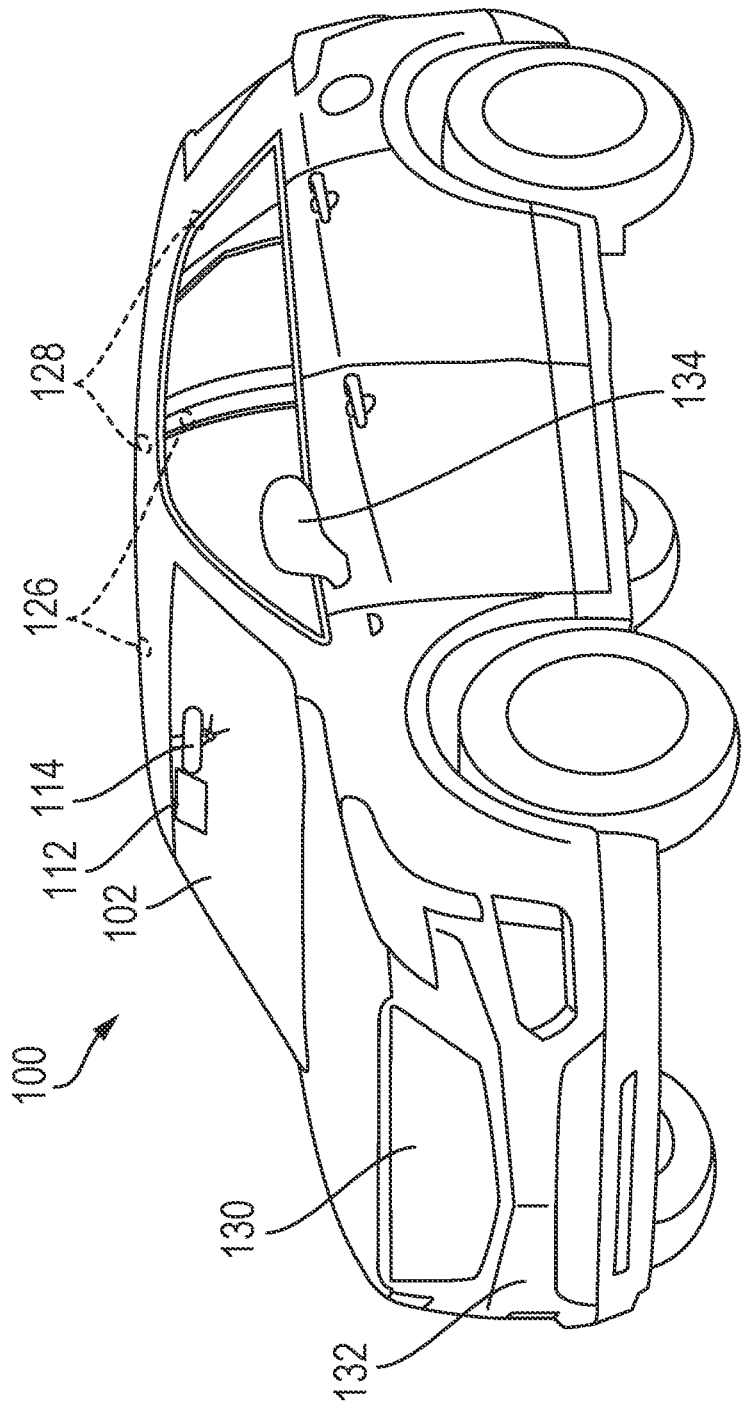
FIG. 1 is a perspective view of a motor vehicle with a driver monitoring system according to embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support feature fusion for near field and far field images. To monitor the area surrounding a vehicle, multiple views of the vehicle's surrounding area may be used. These views may include a perspective view from one or more cameras located on the vehicle. Additionally, top views, also known as birds eye views, provide a top-down view of the vehicle and its surroundings. Specifically, top view segmentation maps that distinguish between different objects in an environment may be used utilized in vehicle applications to provide a 360-degree view of the surroundings. This technology utilizes cameras and sensors to create a detailed map of the area around the vehicle and can be used for navigation, parking assistance, collision avoidance, and other safety features. Top view segmentation maps may be determined based on perspective view image frames captured from cameras located on the vehicle (such as by transforming and combining multiple image frames into a top view of an area surrounding the vehicle).

As vehicle assistance systems add additional cameras, certain such systems combine multiple types of cameras, including both near-field cameras and far-field cameras. Images from both types of cameras may be used as the basis for various perception tasks, such as object detection, lane detection, and obstacle avoidance. Recent approaches have utilized centralized perception models to transform multiple camera views into one representation (such as a top view representation). However, such techniques typically focus on a single type of camera (such as far-field cameras). Accordingly, there exists a need to utilize images from both far-field cameras and near-field camera views for perception tasks.

One solution to this problem is to fuse detected features from near-field image sensors and far-field image sensors. In particular, feature vectors may be determined for received images from near-field image sensors and far-field image sensors. Spatial locations for these features may also be determined, such as spatial locations within a top view of an area surrounding a vehicle on which the image sensors are located. The first set of weighted feature vectors may be determined based on these spatial locations. For example, the first set of weighted feature vectors may be determined to preferentially weight feature values from near-field images for features located near a vehicle and to preferentially weight feature values from far-field images for features located farther from the vehicle. A second set of weighted feature vectors may also be determined based on corresponding features between the feature vectors. For example, the second set of weighted feature vectors may be determined using a pixel adaptive convolution process to identify the corresponding features, to determine weighted combinations of the corresponding features, or combinations thereof. Fused feature vectors may then be determined based on the first set of weighted feature vectors and the second set of weighted feature vectors. For example, the fused feature vectors may be determined using a transformer attention process trained to select and combine features from the first set of weighted feature vectors and the second set of weighted feature vectors. Vehicle control instructions may then be determined based on the fused feature vectors. For example, a top view segmentation map may be determined based on the fused feature vectors, and the top view segmentation map may be used to determine vehicle control instructions.

Stated differently, one proposed solution to the challenge of performing perception tasks on automated systems that utilize near-field and far-field cameras to provide 360 degree coverage around a vehicle is to fuse features from both types of cameras into a single top view. To do so, a method is proposed that combines near-field features from nearby regions around a vehicle with far-field features from further regions around a vehicle using spatial-based weighting and feature-based weighting. Specifically, feature vectors are determined for images received from both near and far-field cameras, and spatial locations for these features are identified within the surrounding area. Weighted feature vectors are then determined based on these spatial locations, with a preference for weighting feature values for features located near the vehicle higher than those for farther features. A second set of weighted feature vectors is also determined based on corresponding features between the feature vectors, using a pixel adaptive convolution process. Fused features may then be determined using an attention-based transformer, trained to select and combine features from both sets of weighted feature vectors. Finally, the fused features may be passed on to respective decoders to determine vehicle control instructions.

Particular implementations of the subject matter described in this disclosure may be implemented to realize one or more of the following potential advantages or benefits. In some aspects, the present disclosure provides techniques for image processing that may be particularly beneficial in smart vehicle applications. For example, the proposed techniques enable the use of multiple types of image sensors for monitoring areas surrounding a vehicle. In particular, these techniques enable the combination of more accurate nearby features from fear field cameras with more accurate further features identified based on far-field cameras. The resulting combination provides feature vectors with greater accuracy for objects, obstacles, and other aspects throughout a vehicle's surrounding. Aggregating multiple types of features for multiple types of image sensors in this way accordingly improves the accuracy of downstream perception tasks that utilize these features to provide vehicle assistance services. In particular, these techniques may enable more accurate tracking of vehicles, pedestrians, obstacles, road signage, road markings, and the like.

One major benefit of improved tracking is that it allows vehicle control systems to more accurately navigate vehicles around obstacles. This can be particularly useful in situations where there may be unexpected obstructions or road conditions that could pose a hazard to drivers. Additionally, improved tracking can help to improve overall safety on the roads by reducing vehicle collisions. With better tracking capabilities, vehicles can be made more responsive to nearby obstacles and can be routed around detected obstacles more efficiently. These improvements can also extend to driver assistance systems, which can benefit from increased monitoring capabilities. By expanding the number, type, and variety of surrounding objects that can be detected, these systems can offer more accurate alerts and assistance to drivers when necessary, without generating unnecessary notifications or distractions.

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or in a forward direction. In some embodiments, an additional camera may be located at the rear of the vehicle 100 and oriented such that the field of view of the additional camera captures a scene behind the vehicle 100 in the direction that the vehicle 100 is moving when in reverse mode or in a reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the vehicle 100 is traveling in a forward direction may likewise be obtained while the vehicle 100 is traveling in a reverse direction.

Further, although embodiments of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
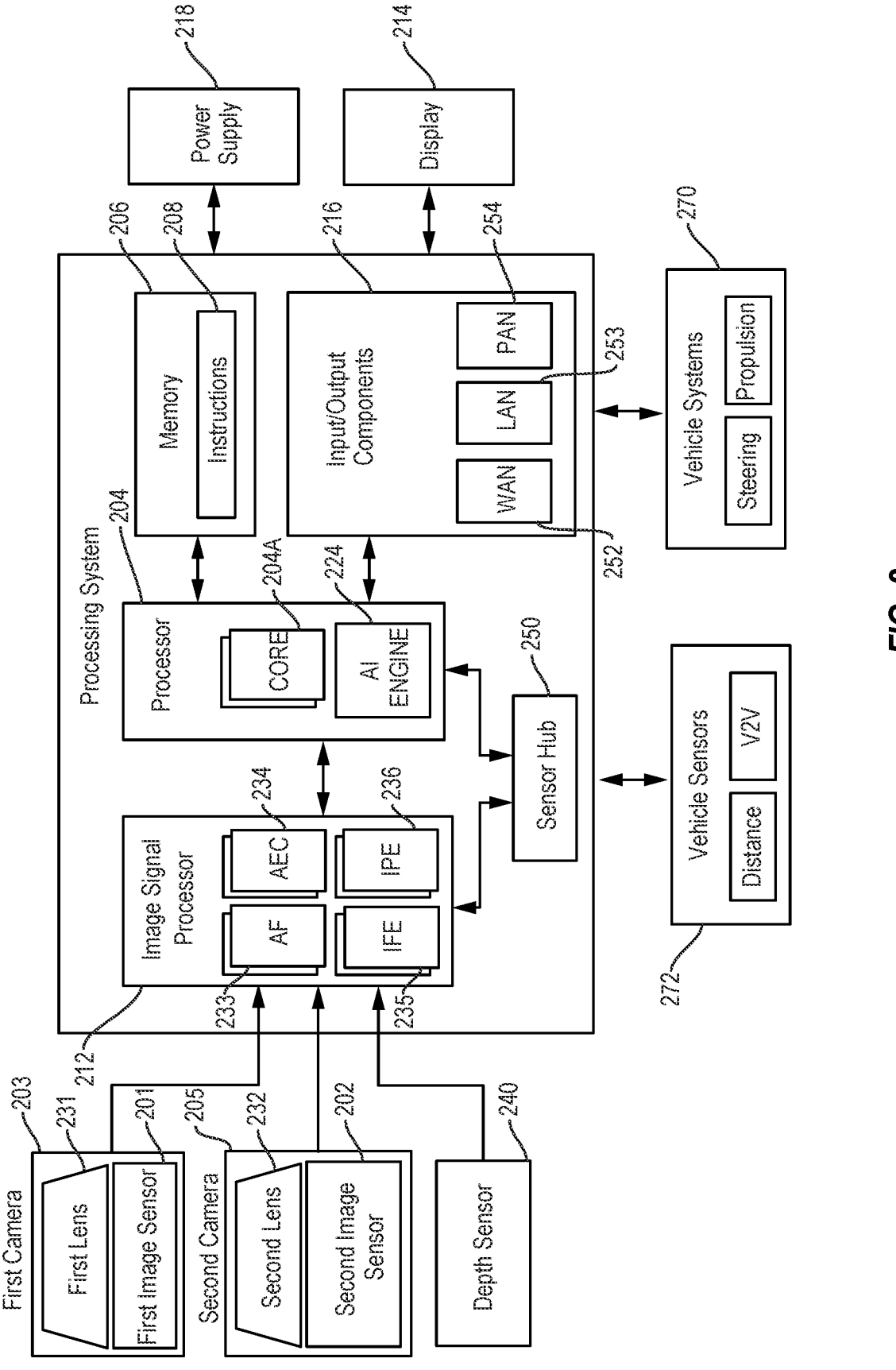
FIG. 2 shows a block diagram of an example image processing configuration for a vehicle according to one or more aspects of the disclosure.

FIG. 2 shows a block diagram of an example image processing configuration for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The device 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The image signal processor (ISP) 212 may receive image data, such as used to form image frames. In one embodiment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire interface may couple the image signal processor 212 to an external image sensor. In a further embodiment, a wireless interface may couple the image signal processor 212 to the image sensor 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjust the lenses 231 and 232 to focus on a particular focal plane at a certain scene depth from the image sensors 201 and 202. The AF algorithm 233 may be assisted by depth sensor 240. In some embodiments, the lenses 231 and 232 may have a fixed focus.

The first image sensor 201 and the second image sensor 202 are configured to capture one or more image frames. Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display on display 114 in the cabin of the vehicle 100.

In some embodiments, the processor 204 may include ICs or other hardware (e.g., an artificial intelligence (AI) engine 224) in addition to the ability to execute software to cause the vehicle 100 to perform a number of functions or operations, such as the operations described herein. In some other embodiments, the vehicle 100 does not include the processor 204, such as when all of the described functionality is configured in the image signal processor 212.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination).

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

Figure 3:
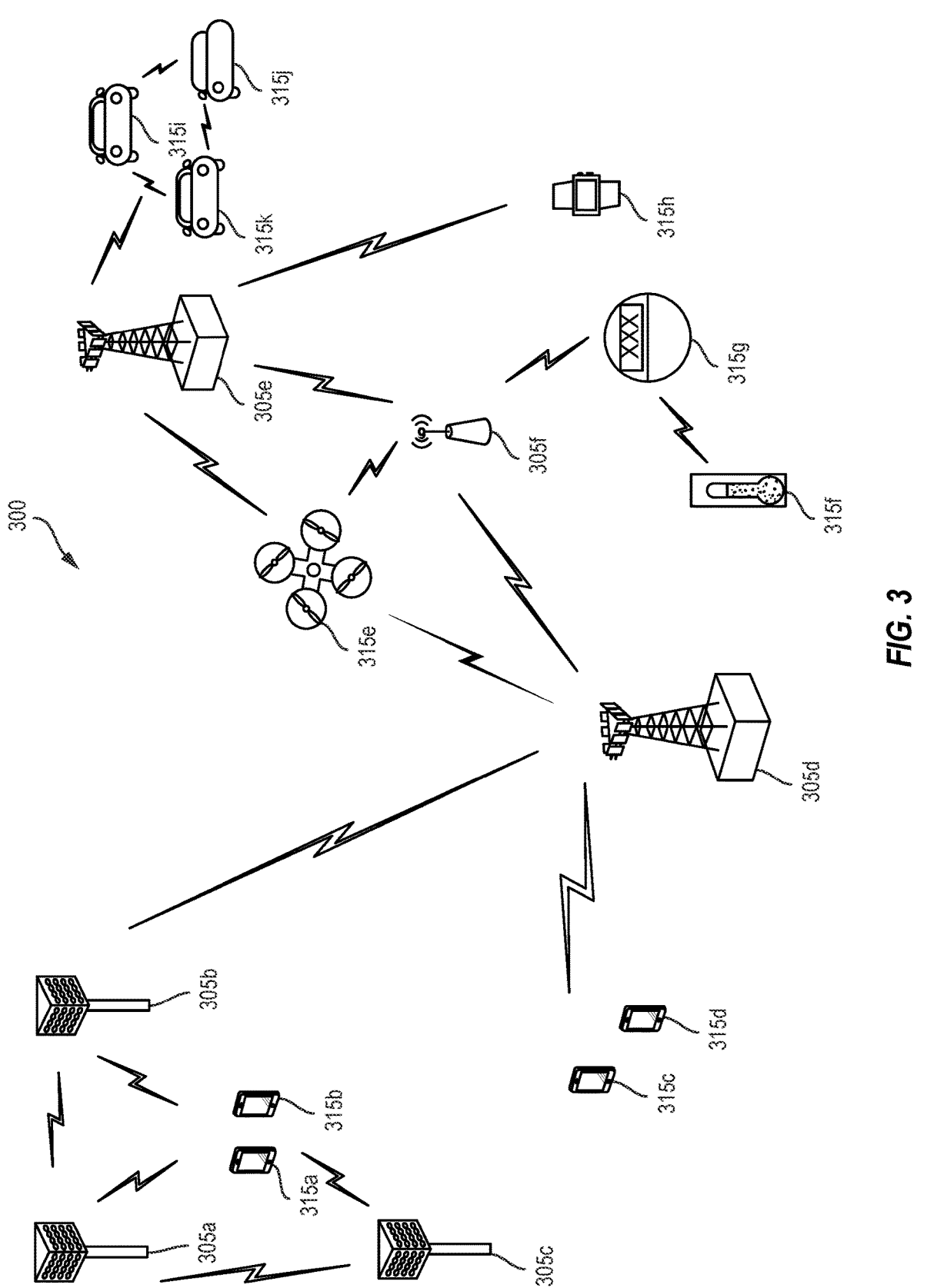
FIG. 3 is a block diagram illustrating details of an example wireless communication system according to one or more aspects.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may, for example, include a 5G wireless network. As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage area, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations 305d and 305e are regular macro base stations, while base stations 305a-305c are macro base stations enabled with one of three-dimension (3D), full dimension (FD), or massive MIMO. Base stations 305a-305c take advantage of their higher dimension MIMO capabilities to exploit 3D beamforming in both elevation and azimuth beamforming to increase coverage and capacity. Base station 305f is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 315, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 315a-j are specifically shown as vehicles, a vehicle may employ the communication configuration described with reference to any of the UEs 315a-315k.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 315a-315d of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT) and the like. UEs 315c-315k illustrated in FIG. 3 are examples of various machines configured for communication that access wireless network 300.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations 305a-305c serve UEs 315a and 315b using 3D beamforming and coordinated spatial techniques, such as coordinated multipoint (CoMP) or multi-connectivity. Macro base station 305d performs backhaul communications with base stations 305a-305c, as well as small cell, base station 305f. Macro base station 305d also transmits multicast services which are subscribed to and received by UEs 315c and 315d. Such multicast services may include mobile television or stream video, or may include other services for providing community information, such as weather emergencies or alerts, such as Amber alerts or gray alerts.

Wireless network 300 of implementations supports mission critical communications with ultra-reliable and redundant links for mission critical devices, such UE 315e, which is a drone. Redundant communication links with UE 315e include from macro base stations 305d and 305c, as well as small cell base station 305f. Other machine type devices, such as UE 315f (thermometer), UE 315g (smart meter), and UE 315h (wearable device) may communicate through wireless network 300 either directly with base stations, such as small cell base station 305f, and macro base station 305c, or in multi-hop configurations by communicating with another user device which relays its information to the network, such as UE 315f communicating temperature measurement information to the smart meter, UE 315g, which is then reported to the network through small cell base station 305f. Wireless network 300 may also provide additional network efficiency through dynamic, low-latency TDD communications or low-latency FDD communications, such as in a vehicle-to-vehicle (V2V) mesh network between UEs 315i-315k communicating with macro base station 305c.

Figure 4:
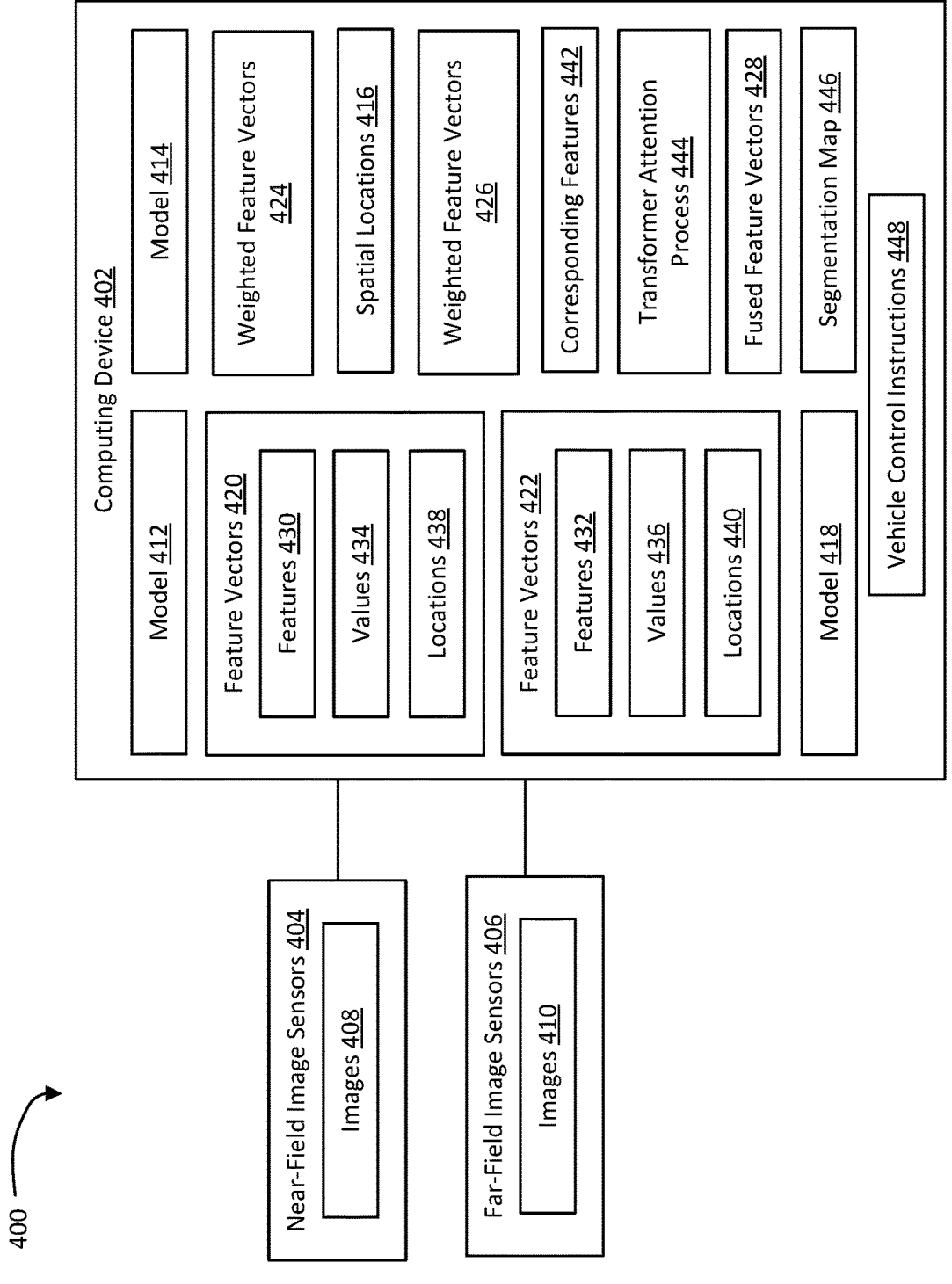
FIG. 4 is a block diagram of a system for feature fusion for near field and far field images according to an exemplary embodiment of the present disclosure.

Aspects of the vehicular systems described with reference to, and shown in, FIG. 1, FIG. 2, and FIG. 3 may include feature fusion for near field and far field images. For example, FIG. 4 is a block diagram of a system for feature fusion for near field and far field images according to an exemplary embodiment of the present disclosure. The system 400 includes near-field image sensors 404, far-field image sensors 406, and a computing device 402. The near-field image sensors 404 include images 408 and the far-field image sensors 406 include images 410. The computing device 402 includes a model 412, a first set of feature vectors 420, a second set of feature vectors 422, a model 414, a first set of weighted feature vectors 424, spatial locations 416, a second set of weighted feature vectors 426, a corresponding features 442, a transformer attention process 444, fused feature vectors 428, a model 418, a top view segmentation map 446, and vehicle control instructions 448. The first set of feature vectors 420 include features 430 values 434, and locations 438. The second set of feature vectors 422 include features 432, values 436, and locations 440.

The computing device 402 may be configured to receive a first plurality of images 408 captured by near-field image sensors 404 and a second plurality of images 410 captured by far-field image sensors 406. In certain implementations, the image frames 408, 410 may be captured from an area around a vehicle. For example, the vehicle may be equipped with one or more image sensors. These image sensors may be configured to capture images on a regular basis. The captured images may cover a wide range of angles and distances, providing a comprehensive view of the area around the vehicle. In certain implementations, the near-field image sensors 404 have a larger field of view than the far-field image sensors 406. In certain implementations, the near-field image sensors 404 have a field of view greater than or equal to 150 degrees and the far-field image sensors 406 have a field of view less than or equal to 120 degrees. For example, the near-field image sensors 404 may have a field of view of 150 degrees, 160 degrees, 170 degrees, 180 degrees, 190 degrees, or more and the far-field image sensors 406 may have a field of view of 120 degrees, 90 degrees, 60 degrees, and the like. In certain implementations, a near-field image sensor may be implemented as a regular image sensor with a fisheye lens. For example, the near-field image sensors 404 may include one or more fisheye cameras positioned on a vehicle. In certain implementations, the far-field image sensors 406 may include one or more pinhole cameras positioned on a vehicle. In certain implementations, the far-field image sensors 406 may have a field of view larger than 120 degrees, but may still have a field of view less than the near-field image sensors 404. For example, the far-field image sensors 406 may have a field of view of 150 degrees and the near-field image sensors 404 may have a field of view of 180 degrees. In certain implementations, fields of view may differ slightly between image sensors of the same type. For example, fields of view for two near-field image sensors 404 may differ from one another (such as by 20% or less, 10% or less, 5% or less, 1% or less). As another example, fields of view for two far-field image sensors 406 may differ from one another (such as by 20% or less, 10% or less, 5% or less, 1% or less). Differences in fields of view may be caused by different positioning or mounting of image sensors on a vehicle, calibration errors, manufacturing inconsistencies, and the like. In various implementations, image sensors with different fields of view may still be considered the same type of image sensors for the purposes of the present disclosure.

Figure 5:
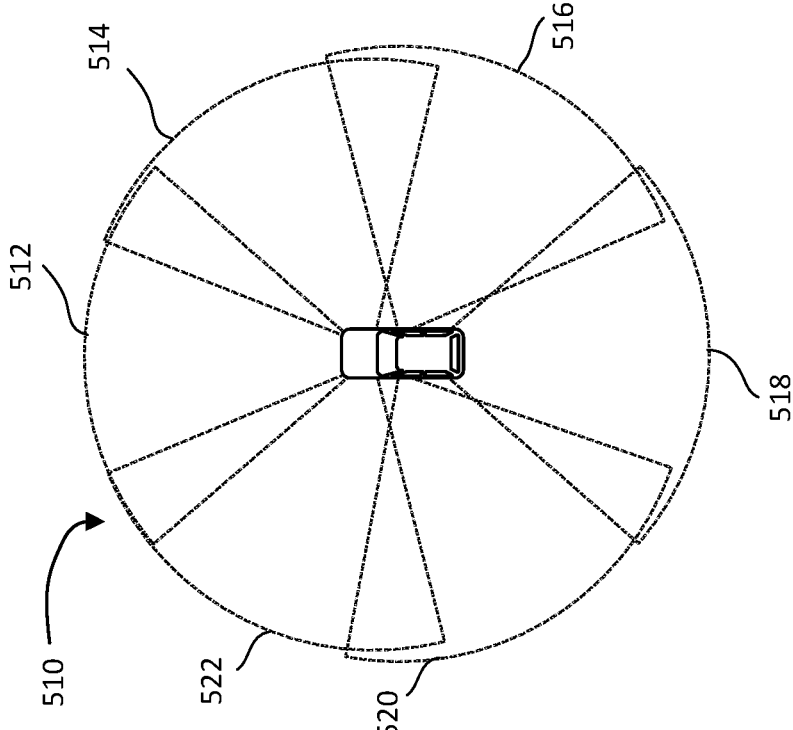
FIG. 5 depicts image sensor configurations for a vehicle according to an exemplary embodiment of the present disclosure.
Figure 5:
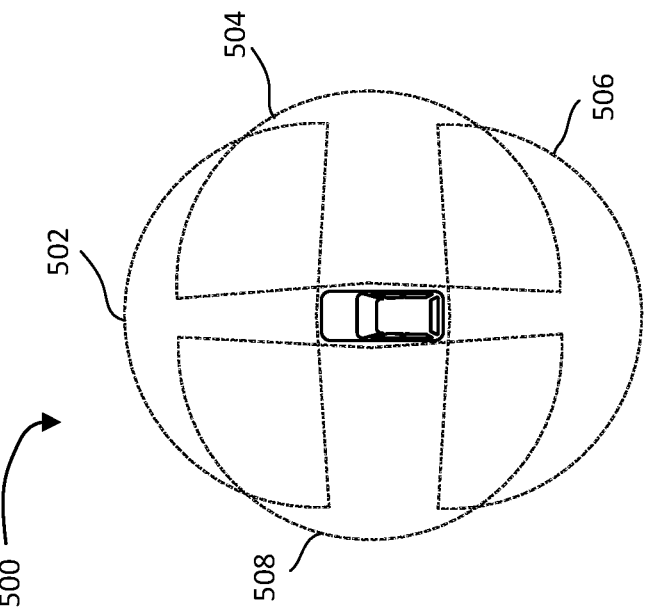

FIG. 5 depicts image sensor configurations 500, 510 for a vehicle according to an exemplary embodiment of the present disclosure. The first image sensor configuration 500 shows a potential arrangement of near-field image sensors 502, 504, 506, 508, such as near-field image sensors 404 with a field of view of 180 degrees. In particular, the first configuration 500 utilizes 4 near-field image sensors to visually cover an area surrounding the vehicle. The second image sensor configuration 510 shows a potential arrangement of far-field image sensors 512, 514, 516, 518, 520, 522, such as far-field image sensors 406 with a field of view of approximately 70 degrees. In particular, the second configuration 510 utilizes 6 far-field image sensors to visually cover an area surrounding the vehicle. As can be seen in the configurations 500, 510, certain areas may be covered by more than one image sensors. For example, image sensors 502 and 504 have partially overlapping areas and image sensors 512, 514 have partially overlapping areas. Similarly, image sensors of different types may overlap. For example, a single vehicle may be equipped with both near-field image sensors 502, 504, 506, 508 arranged as shown for the configuration 500 and far-field image sensors 512, 514, 516, 518, 520, 522 as shown for the configuration 510. In such instances, certain near-field and far-field image sensors may have overlapping areas (such as the image sensor 502 and the image sensors 512, 514).

Returning to FIG. 4, the computing device 402 may be configured to determine a first set of feature vectors 420 for the first plurality of images 408 and a second set of feature vectors 422 from the second plurality of images 410. In certain implementations, the first and second sets of feature vectors specify (i) values 434, 436 and (ii) locations 438, 440 for a plurality of features 430, 432. In certain implementations, the plurality of features 430, 432 may include numerical representations of various aspects of an image. Some examples of features 430, 432 include color histograms, texture descriptors, edge detection, and shape analysis. Color histograms may quantify the distribution of colors in an image, while texture descriptors may capture patterns such as roughness or smoothness. Edge detections may identify boundaries between objects in an image, while shape analysis may identify or otherwise distinguish different types of objects based on geometric properties of the object within the image frame. In certain implementations, feature vectors may be single-dimensional, such as an N×1 vector, where N may be the number of features 430, 432. In additional or alternative implementations, feature vectors may be multi-dimensional, such as an N×M×O vector, where at least two of N, M, and O are greater than 1. In certain implementations, the plurality of features 430, 432 may be selected or otherwise identified during training of a model 412 used to determine the feature vectors 420, 422, such as an encoder model as explained further below. In certain implementations, the locations 438, 440 identified by the first set of feature vectors 420 and the second set of feature vectors 422 may indicate locations 438, 440 of the features 430, 432 within the received images. For example, individual pixel or combinations thereof may have a corresponding vector that may include values 434, 436 in corresponding positions for each of at least a subset of the plurality of features 430, 432. In certain implementations, more than one feature vector may be determined for each received image (such as separate feature vectors for individual pixels or groups of pixels within an image). In additional or alternative implementations, feature vectors for multiple locations within the images may be grouped together to form the first set of feature vectors 420. For example, feature values for all pixels within an image may be grouped into a single feature vector for that image (such as in combination with identifiers of corresponding pixel(s) within the image). In certain such implementations, the feature vectors 420, 422 may have the same resolution as the images. In additional or alternative implementations, the feature vectors 420, 422 may have a different resolution from corresponding images (such as a lower resolution, a higher resolution, or combinations thereof). In certain implementations, the feature vectors 420, 422 for the first plurality of images 408 and the second plurality of images 410 are identified by an encoder model 412. In certain implementations, encoder models for image processing may be machine learning models trained to take an input image and encode the input into a lower-dimensional representation, which can be used for various tasks such as image classification, object detection, or image generation. In certain implementations, encoder models may be implemented as neural networks (such as convolutional neural networks, recurrent neural networks), transformer models, autoencoder models, and the like. In certain implementations, a single encoder model may be trained to determine the first set of feature vectors 420 and the second set of feature vectors 422. In additional or alternative implementations, multiple encoder models may be used, such as a first encoder model to determine the first set of feature vectors 420 and a second encoder model to determine the second set of feature vectors 422. In certain implementations, the first set of feature vectors 420 for images from near-field image sensors 404 may have the same features (such as may determine feature values for the same types of features) as the second set of feature vectors 422 for images from far-field image sensors 406. For example, the same encoder model 412 may be used to determine the first set of feature vectors 420 and the second set of feature vectors 422 using the same features 430, 432. In additional or alternative implementations, the first set of feature vectors 420 may have different features from the second set of feature vectors 422. For example, separate encoder models 412 may be used to determine the first set of feature vectors 420 and the second set of feature vectors 422 with different features 430, 432.

The computing device 402 may be configured to determine a first set of weighted feature vectors 424 based on spatial locations 416 for features 430, 432 from the first set of feature vectors 420 and the second set of feature vectors 422. In certain implementations, the computing device 402 is further configured to determine spatial locations 416 of the first and second sets of feature vectors within a physical area surrounding the vehicle. In certain implementations, the spatial locations 416 are determined as part of a top view of the physical area surrounding the vehicle. In certain implementations, the spatial locations 416 may be determined by projecting feature locations 438, 440 within the images to corresponding locations 438, 440 within the area surrounding the vehicle. For example, the spatial locations 416 may be determined based on the position, size, and orientation of certain features 430, 432, as well as based on known orientations of the image sensors relative to the vehicle (such as which portions of the physical area are covered by image sensors that captured the images). In certain implementations, a range or size of the top view for the vehicle may be predetermined (such as a range within 200 meters surrounding the vehicle, 150 meters surrounding the vehicle, 100 meters surrounding the vehicle, 50 meters surrounding the vehicle, and the like). In certain implementations, a resolution of the top view may differ from a resolution of one or more of the received images. For example, in certain implementations, the top view may have a resolution of 128×128 pixels, 256×256 pixels, 512×512 pixels, and the like.

In certain implementations, the spatial locations 416 specify coordinates of features 430, 432 within the feature vectors 420, 422 relative to a location of the vehicle. In certain implementations, the coordinates specify a distance from the vehicle and an angular offset from a heading of the vehicle for the features 430, 432. In certain implementations, the spatial locations 416 may be determined as polar coordinates within the area surrounding the vehicle. In certain implementations, spatial locations 416 may be determined for each feature of the feature vectors. In additional or alternative implementations, spatial locations 416 may only be determined for a subset of the features 430, 432 within the feature vectors. In certain implementations, the spatial locations 416 of the features 430, 432 may be used as the locations 438, 440 for the features 430, 432 within the first and second feature vectors 420, 422. For example, when determining the first set of feature vectors 420 and the second set of feature vectors 422, the computing device 402 may determine spatial locations 416 for identified features 430, 432 and may store the spatial locations 416 of the features 430, 432 as the locations 438, 440 within the first set of feature vectors 420 and the second set of feature vectors 422.

In certain implementations, determining the first set of weighted feature vectors 424 includes determining, for feature values 434 from the first set of feature vectors 420, higher weights to features 430 that are located closer to the vehicle. Determining the first set of weighted feature vectors 426 may also include determining, for feature values 436 from the second set of feature vectors 422, higher weights to features 432 that are located further from the vehicle. In certain implementations, features 430, 432 located closer to the vehicle may be identified as features 430, 432 located within a predetermined threshold distance of the vehicle (such as within 5 meters, 10 meters, 20 meters, 30 meters, and the like). In such implementations, feature values 434, 436 from the first set of feature vectors 420 may be assigned a higher weight (such as a predetermined higher weight). In additional or alternative implementations, weights for the first set of feature vectors 420 may be determined as a function of the distance to the vehicle (such as a linearly or non-linearly decreasing function). In certain implementations, for features 430, 432 at the same or similar location (such as located within a threshold distance of one another), weights may be determined for corresponding feature values 434, 436 and used to combine the feature values 434, 436 into a single weighted feature value for the corresponding location. Accordingly, the determined weights for a particular feature value may serve as relative weights against the other feature values 434, 436 being combined. In particular, the weights for all feature values 434, 436 being combined at a certain location may be normalized (such as so that all weights for the combined feature values 434, 436 sum to 1). As one example, suppose an edge may be detected at a location 5 m from the vehicle within 1 image captured by a near-field image sensor and 2 images captured by overlapping far-field sensors. In this example, the computing device 402 may identify 3 corresponding feature values 434, 436 for combination. Based on the distance to the feature, the feature value from the near-field image sensors 404 may be assigned a higher weight (such as 0.6) and the feature values from the far-field image sensors 406 may be assigned lower weights (such as 0.2). Notably, the weights for all 3 images sum to 0.6+0.2+0.2=1. As another example, suppose a blue color feature 430, 432 is detected at a location 55 m from the vehicle within 1 image captured by a near-field image sensor and 1 image captured by a far-field sensors. Based on the distance to the feature, the feature value from the far-field image sensor may be assigned a higher weight (such as 0.9) and the feature value from the near-field sensor may be assigned a lower weight (such as 0.1).

In certain implementations, such weights may account for the fact that near-field cameras are more likely to have accurate features 430, and thus accurate feature values 434, based on objects (and thus features 430) located near the vehicle. In particular, the wider field of view for near-field image sensors 404 means that these image sensors have better coverage and more detail for objects located near the vehicle. By contrast, as objects go further away, the relative number of pixels corresponding to those objects decreases drastically as a result of the wider field of view. Conversely, far-field image sensors 406 may have relatively limited coverage of objects that are located near a vehicle (such as because a single object located near the vehicle may be more likely to spread across multiple far-field image sensors 406). Relatedly, though, the narrower field of view of far-field image sensors 406 may improve coverage of objects and corresponding features 442 located further from the vehicle (such as because more pixels are able to capture details of the further objects due to the reduced field of view).

In additional or alternative implementations, further spatial details regarding the locations 438, 440 of features 430,

432 may be utilized to determine the first set of weighted feature vectors 424. For example, in addition to distance and offset angles, spatial locations 416 may include azimuth angles for objects. The azimuth angles may reflect a vertical offset of a detected feature within one or more images that captured the detected feature. In certain implementations, near-field image sensors 404 may be more accurate for features 430, 432 with large azimuth angles compared to far-field image sensors 406. Accordingly, in such implementations, higher weights may be assigned to feature values 434, 436 with large azimuth angles when those feature values 434, 436 were determined based on one of the first plurality of images 408 captured by the near-field image sensors 404. Furthermore, it should be understood that feature values 434, 436 for the same feature captured by the same type of image sensor may receive different weights. For example, the lateral angle offsets of features 430, 432 within one or more images that contain the features 430, 432 may be used to determine the weight for corresponding feature values 434, 436. Features 430, 432 located near the center of an image may be more likely to be accurate than features 430, 432 closer to the edges of the images. Accordingly, feature values 434, 436 with smaller offset angles may be weighted higher than feature values 434, 436 with higher offset angles. as a specific example, an edge feature may be identified in the same location for a first feature vector and a second feature vector, both corresponding to images captured by far field image sensors. The feature may be located near the center of the image for the first feature vector and closer to the edge (such as with a higher offset angle) of the image for the second feature vector. In such instances, even though both feature values 434, 436 correspond to features 430, 432 from images captured by the same type of image sensor, a first feature value from the first feature vector may receive a higher weight than a second feature value from the second feature vector.

The computing device 402 may be configured to determine a second set of weighted feature vectors 426 based on corresponding features 442 between the first set of feature vectors 420 and the second set of feature vectors 422. In certain implementations, determining the second set of weighted feature vectors 426 includes determining sets of corresponding features 442 between the feature vectors. Each set of corresponding features 442 may identify at least two feature values 434, 436 from at least two feature vectors located in the same or similar location. In certain implementations, features located in the same or similar location may include features 430, 432 with locations 438, 440 (such as spatial locations 416) that are within a threshold distance of one another (such as within a 5-meter radius, within a 1-meter radius, within a 0.5-meter radius, within a 0.1-meter radius, and the like). Additionally, corresponding features 442 may include the same feature from multiple feature vectors. For example, the feature vectors may store corresponding feature values 434, 436 for the same features 430, 432 within the same position in the vectors. Accordingly, corresponding features 442 may be identified as containing feature values 434, 436 located within a threshold distance of one another from the same position within the feature factors.

In certain implementations, each of at least a subset of the sets of corresponding features 442 may be used to determine a corresponding feature value of the second set of weighted feature vectors 426. For example, the computing device 402 may be configured to determine a single weighted feature value for each set from of at least a subset of the sets of corresponding features 442. In certain implementations, determining the second set of weighted feature vectors 426 comprises determining weighted feature values based on feature values 434, 436 for corresponding features 442. In particular, weights may be determined for each of the feature values 434, 436 within a set of corresponding features 442 and may be used to determine a weighted combination (such as a weighted sum) of the feature values 434, 436. In certain implementations, the weights for the sets corresponding features 442 may be normalized such that the weights for all feature values 434. 436 within an individual set of corresponding features 442 sum to 1.

In certain implementations, the weighted feature values are determined using a pixel adaptive convolution process. In certain implementations, the pixel-adaptive convolution (PAC) process may be implemented as a convolution operation that uses a spatially varying kernel based on learnable local pixel features. The kernel may be configured such that the PAC process determines weighted combinations of sets of corresponding features 442. In certain implementations, the PAC process may receive the sets of corresponding features 442 and may determine weighted feature values for the sets. In additional or alternative implementations, the kernel may be configured to identify and combine the corresponding features 442. In such instances, the PAC process may receive the first set of feature vectors 420 and the second set of feature vectors 422 and may directly determine the weighted feature values based on the received feature vectors. In certain implementations, the kernel may be determined according to one or more training operations that measures the difference between a predicted output (such as a resulting top view segmentation map 446 or feature map) and ground truth (such as a known or labeled top view segmentation map 446 or feature map). In certain implementations, one or both of the first set of weighted feature vectors 424 and the second set of weighted feature vectors 426 may respectively contain multiple feature vectors. For example, the first set of weighted feature vectors 424 may contain separate weighted feature vectors corresponding to separate portions of an area surrounding the vehicle. Additionally or alternatively, one or both of the first set of weighted feature vectors 424 and the second set of weighted feature vectors 426 may contain a single feature vector. For example, the second set of weighted feature vectors 426 may contain a single weighted feature vector corresponding to the area surrounding the vehicle (such as the entire area surrounding the vehicle as relevant for determining a top view segmentation map 446). In certain implementations, the first set of weighted feature vectors 424 may contain the same number of feature vectors as the second set of weighted feature vectors 426. In additional or alternative implementations, the first set of weighted feature vectors 424 may have a different number of feature vectors from the second set of weighted feature vectors 426.

The computing device 402 may be configured to determine fused feature vectors 428 based on the first set of weighted feature vectors 424 and the second set of weighted feature vectors 426. In certain implementations, the fused feature vectors 428 may contain the same features 430, 432 as the feature vectors, the weighted feature vectors, or combinations thereof. In additional or alternative implementations, the fused feature vectors 428 may contain different features 430, 432 from the feature vectors, the weighted feature vectors, or combinations thereof. In certain implementations, the fused feature vectors 428 are determined based on a transformer attention process 444 that receives the first set of weighted feature vectors 424 and the second set of weighted feature vectors 426. In certain implementations, the second set of weighted feature vectors 426 are provided as query vectors to the transformer attention process 444 and the first set of weighted feature vectors 424 are provided as key vectors to the transformer attention process 444. In certain implementations, the fused feature vectors 428 are determined based on output values 434, 436 from the transformer attention process 444. In certain implementations, the computing device 402 may be configured to utilize the transformer attention process 444 to fuse feature values 434, 436 from the first set of feature values 434, 436 and the second set of feature values 434, 436. The transformer attention process 444 may operate in practice as a mapping between a query vector and a key vector to an output vector, where values 434, 436 within the output vector are determined as a weighted combination of corresponding values 434, 436 from the query vector and the key vector. In certain implementations, the weights assigned to each value may be determined by a compatibility function between the query vector and the key vector. the compatibility function may be determined during training for the transformer attention process 444, and may enable feature vectors from multiple features 430, 432 to be combined into a single weighted value within the output vector. In certain implementations, the second set of weighted feature vectors 426 may be provided as the query vector(s) and the first set of weighted feature vectors 424 are provided as the key vector(s). In such implementations, in response to the received query and key vectors, the attention block may generate one or more values 434, 436. These values 434, 436 may serve as the fused feature values 434, 436 for the fused feature vectors 428. In implementations where the first set of weighted feature vectors 424 and the second set of weighted feature vectors 426 each contain a single vector, the corresponding two vectors may be provided to the transformer attention process 444 to determine a single fused feature vector. Additionally or alternatively, where one or both of the first set of weighted feature vectors 424 and the second set of weighted feature values contain more than one vector, each vector may be provided separately to the transformer attention process 444 to determine a corresponding fused feature vector.

The computing device 402 may be configured to determine vehicle control instructions 448 based on the fused feature vectors 428. In certain implementations, vehicle control instructions 448 may refer to the set of commands and guidelines that directly or indirectly regulate the movement of a vehicle. These instructions may come in the form of direct vehicular control instructions, such as steering, braking, accelerating or combinations thereof. In additional or alternative implementations, vehicle control instructions 448 may be supplementary instructions that support driver assistance programs, such as obstacle avoidance, blind spot monitoring, and other driver assistance alerts. Control instructions may accordingly help drivers to maintain safe operation of vehicles while driving on roads and highways.

In certain implementations, the computing device 402 may be further configured to determine, based on the fused feature vectors 428, a top view segmentation map 446 of an area surrounding the vehicle. In such implementations, the vehicle control instructions 448 may be determined based on the top view segmentation map 446. For example, the computing device 402 may perform one or more object detection tasks, segmentation tasks, navigation tasks, and the like. In one particular implementation, a top view segmentation map 446 may be determined based on the combined set of image frames, and may be used to determine the vehicle control instructions 448 (such as by identifying one or more obstacles, other vehicles, road markings, traffic signals, and the like within the environment surrounding the vehicle). In implementations where spatial locations 416 in a top view for the vehicle have previously been determined (such as using one or more of the above-described techniques), the spatial locations 416 may be used to determine the top view segmentation map 446. For example, in such instances, the fused feature vectors 428 may form a single set of top view features 430, 432 with corresponding spatial locations 416 within the top view of the vehicle. In such instances, the fused feature vectors 428 may be provided to a decoder model configured to determine top view segmentation maps based on feature vectors identifying features 430, 432 with top view location coordinates. In certain implementations, decoder models for image process may be machine learning models trained to take an input of one or more features 430, 432 and to generate one or more images based on the received input. In certain implementations, decoder models may work in the opposite direction of encoder models, which extract features from input images. In certain implementations, decoder models may be implemented as neural networks (such as convolutional neural networks, recurrent neural networks), transformer models, autoencoder models, and the like. In additional or alternative implementations, locations 438, 440 for the features 430, 432 in the first set of feature vectors 420 and the second set of feature vectors 422 may not be projected, and thus the fused set of feature vectors may not include spatial locations 416 for the features 430, 432 within a top view for the vehicle. In such instances, the features 430, 432 may be projected to top view locations 438, 440 (such as using techniques similar to those discussed above) before determining the top view segmentation map 446. Once projected, the top view segmentation map 446 may be determined as described above (such as using a decoder model).

One method of performing image processing according to embodiments described above is shown in FIG. 6. FIG. 6 is a flow chart illustrating an example method 600 for feature fusion for near field and far field images. The method may be performed by one or more of the above systems, such as the systems 100, 200, 300, 400.

The method 600 includes receiving a first plurality of images captured by near-field image sensors and a second plurality of images captured by far-field image sensors (block 602). For example, the computing device 402 may receive a first plurality of images 408 captured by near-field image sensors 404 and a second plurality of images 410 captured by far-field image sensors 406.

The method 600 includes determining a first set of feature vectors for the first plurality of images and a second set of feature vectors from the second plurality of images (block 604). For example, the computing device 402 may determine a first set of feature vectors 420 for the first plurality of images 408 and a second set of feature vectors 422 from the second plurality of images 410. In certain implementations, the first and second sets of feature vectors specify (i) values 434, 436 and (ii) locations 438, 440 for a plurality of features 430, 432. In certain implementations, the plurality of features 430, 432 may be selected or otherwise identified during training of a model 412 used to determine the feature vectors, such as an encoder model. In certain implementations, the locations 438, 440 identified by the first set of feature vectors 420 and the second set of feature vectors 422 may indicate locations 438, 440 of the features 430, 432 within the received images.

The method 600 includes determining a first set of weighted feature vectors based on spatial locations for features from the first set of feature vectors and the second set of feature vectors (block 606). For example, the computing device 402 may determine a first set of weighted feature vectors 424 based on spatial locations 416 for features 430, 432 from the first set of feature vectors 420 and the second set of feature vectors 422. In certain implementations, determining the first set of weighted feature vectors 424 further includes determining spatial locations 416 of the first and second sets of feature vectors within a physical area surrounding the vehicle. In certain implementations, the spatial locations 416 are determined as part of a top view of the physical area surrounding the vehicle. In certain implementations, the spatial locations 416 may be determined by projecting feature locations 438, 440 within the images to corresponding locations 438, 440 within the area surrounding the vehicle. In certain implementations, the spatial locations 416 specify coordinates of features 430, 432 within the feature vectors relative to a location of the vehicle. In certain implementations, the coordinates specify a distance from the vehicle and an angular offset from a heading of the vehicle for corresponding features 442. In certain implementations, the spatial locations 416 may be determined as polar coordinates within the area surrounding the vehicle. In certain implementations, determining the first set of weighted feature vectors 424 includes determining, for feature values 434, 436 from the first set of feature vectors 420, higher weights to features 430, 432 that are located closer to the vehicle and determining, for feature values 434, 436 from the second set of feature vectors 422, higher weights to features 430, 432 that are located further from the vehicle.

The method 600 includes determining a second set of weighted feature vectors based on corresponding features between the first set of feature vectors and the second set of feature vectors (block 608). For example, the computing device 402 may determine a second set of weighted feature vectors 426 based on corresponding features 442 between the first set of feature vectors 420 and the second set of feature vectors 422. In certain implementations, determining the second set of weighted feature vectors 426 includes determining sets of corresponding features 442 between the feature vectors, and each set of corresponding features 442 identifies at least two feature values 434, 436 from at least two feature vectors located in the same or similar location. In certain implementations, each of at least a subset of the sets of corresponding features 442 may be used to determine a corresponding feature value of the second set of weighted feature vectors 426. In certain implementations, determining the second set of weighted feature vectors 426 includes determining weighted feature values based on feature values 434, 436 for corresponding features 442.

The method 600 includes determining fused feature vectors based on the first set of weighted feature vectors and the second set of weighted feature vectors (block 610). For example, the computing device 402 may determine fused feature vectors 428 based on the first set of weighted feature vectors 424 and the second set of weighted feature vectors 426. In certain implementations, the fused feature vectors 428 are determined based on a transformer attention process 444 that receives the first set of weighted feature vectors 424 and the second set of weighted feature vectors 426. In certain implementations, the second set of weighted feature vectors 426 are provided as query vectors to the transformer attention process 444 and the first set of weighted feature vectors 424 are provided as key vectors to the transformer attention process 444. In certain implementations, the fused feature vectors 428 are determined based on output values 434, 436 from the transformer attention process 444.

The method 600 includes determining vehicle control instructions based on the fused feature vectors (block 612). For example, the computing device 402 may determine vehicle control instructions 448 based on the fused feature vectors 428. In certain implementations, the method 600 further includes determining, based on the fused feature vectors 428, a top view segmentation map 446 of an area surrounding the vehicle, and the vehicle control instructions 448 may be determined based on the top view segmentation map 446.

It is noted that one or more blocks (or operations) described with reference to FIG. 5 may be combined with one or more blocks (or operations) described with reference to another of the figures. For example, one or more blocks (or operations) of FIG. 5 may be combined with one or more blocks (or operations) of FIG. 1-3. As another example, one or more blocks associated with FIG. 5 may be combined with one or more blocks associated with FIG. 4.

In one or more aspects, techniques for supporting vehicular operations may include additional aspects, such as any single aspect or any combination of aspects described below or in connection with one or more other processes or devices described elsewhere herein. A first aspect includes a method for image processing for use in a vehicle assistance system that includes receiving a first plurality of images captured by near-field image sensors and a second plurality of images captured by far-field image sensors. The method also includes determining a first set of feature vectors for the first plurality of images and a second set of feature vectors from the second plurality of images. The method also includes determining a first set of weighted feature vectors based on spatial locations for features from the first set of feature vectors and the second set of feature vectors. The method also includes determining a second set of weighted feature vectors based on corresponding features between the first set of feature vectors and the second set of feature vectors. The method also includes determining fused feature vectors based on the first set of weighted feature vectors and the second set of weighted feature vectors. The method also includes determining vehicle control instructions for a vehicle based on the fused feature vectors.

In a second aspect, in combination with the first aspect, determining the first set of weighted feature vectors may include determining, for feature values from the first set of feature vectors, higher weights to features that are located closer to the vehicle and determining, for feature values from the second set of feature vectors, higher weights to features that are located further from the vehicle.

In a third aspect, in combination with one or more of the first aspect through the second aspect, determining the second set of weighted feature vectors may include determining sets of corresponding features between the feature vectors, where each set of corresponding features identifies at least two feature values from at least two feature vectors located in the same or similar location.

In a fourth aspect, in combination with the third aspect, each of at least a subset of the sets of corresponding features is used to determine a corresponding feature value of the second set of weighted feature vectors.

In a fifth aspect, in combination with one or more of the first aspect through the fourth aspect, determining the second set of weighted feature vectors may include determining weighted feature values based on feature values for corresponding features.

In a sixth aspect, in combination with the fifth aspect, the weighted feature values are determined using a pixel adaptive convolution process.

In a seventh aspect, in combination with one or more of the first aspect through the sixth aspect, the fused feature vectors are determined based on a transformer attention process that receives the first set of weighted feature vectors and the second set of weighted feature vectors.

In an eighth aspect, in combination with the seventh aspect, the second set of weighted feature vectors are provided as query vectors to the transformer attention process and the first set of weighted feature vectors are provided as key vectors to the transformer attention process.

In a ninth aspect, in combination with the eighth aspect, the fused feature vectors are determined based on output values from the transformer attention process.

In a tenth aspect, in combination with one or more of the first aspect through the ninth aspect, the feature vectors for the first plurality of images and the second plurality of images are identified by an encoder model.

In an eleventh aspect, in combination with one or more of the first aspect through the tenth aspect, the method may include determining spatial locations of the first and second sets of feature vectors within a physical area surrounding a vehicle.

In a twelfth aspect, in combination with the eleventh aspect, the spatial locations are determined as part of a top view of the physical area surrounding the vehicle.

In a thirteenth aspect, in combination with one or more of the eleventh aspect through the twelfth aspect, the spatial locations specify a distance from the vehicle and an angular offset from a heading of the vehicle for corresponding features.

In a fourteenth aspect, in combination with one or more of the first aspect through the thirteenth aspect, the method further includes determining, based on the fused feature vectors, a top view segmentation map of an area surrounding the vehicle and the vehicle control instructions are determined based on the top view segmentation map.

A fifteenth aspect includes an apparatus that includes a memory storing processor-readable code and at least one processor coupled to the memory. The at least one processor may be configured to execute the processor-readable code to cause the at least one processor to perform operations including receiving a first plurality of images captured by near-field image sensors and a second plurality of images captured by far-field image sensors. The operations also include determining a first set of feature vectors for the first plurality of images and a second set of feature vectors from the second plurality of images. The operations also include determining a first set of weighted feature vectors based on spatial locations for features from the first set of feature vectors and the second set of feature vectors. The operations also include determining a second set of weighted feature vectors based on corresponding features between the first set of feature vectors and the second set of feature vectors. The operations also include determining fused feature vectors based on the first set of weighted feature vectors and the second set of weighted feature vectors. The operations also include determining vehicle control instructions for a vehicle based on the fused feature vectors. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a sixteenth aspect, in combination with the fifteenth aspect, determining the first set of weighted feature vectors may include determining, for feature values from the first set of feature vectors, higher weights to features that are located closer to the vehicle and determining, for feature values from the second set of feature vectors, higher weights to features that are located further from the vehicle.

In a seventeenth aspect, in combination with one or more of the fifteenth aspect through the sixteenth aspect, determining the second set of weighted feature vectors may include determining weighted feature values based on feature values for corresponding features.

In an eighteenth aspect, in combination with the seventeenth aspect, the weighted feature values are determined using a pixel adaptive convolution process.

In a nineteenth aspect, in combination with one or more of the fifteenth aspect through the eighteenth aspect, the fused feature vectors are determined based on a transformer attention process that receives the first set of weighted feature vectors and the second set of weighted feature vectors.

In a twentieth aspect, in combination with the nineteenth aspect, the second set of weighted feature vectors are provided as query vectors to the transformer attention process and the first set of weighted feature vectors are provided as key vectors to the transformer attention process.

In a twenty-first aspect, in combination with the twentieth aspect, the fused feature vectors are determined based on output values from the transformer attention process.

In a twenty-second aspect, in combination with one or more of the fifteenth aspect through the twenty-first aspect, the operations further include determining, based on the fused feature vectors, a top view segmentation map of an area surrounding the vehicle, where the vehicle control instructions are determined based on the top view segmentation map.

A twenty-third aspect includes a non-transitory computer-readable medium storing instructions that, when executed by a processor, cause the processor to perform operations including receiving a first plurality of images captured by near-field image sensors and a second plurality of images captured by far-field image sensors. The operations also include determining a first set of feature vectors for the first plurality of images and a second set of feature vectors from the second plurality of images. The operations also include determining a first set of weighted feature vectors based on spatial locations for features from the first set of feature vectors and the second set of feature vectors. The operations also include determining a second set of weighted feature vectors based on corresponding features between the first set of feature vectors and the second set of feature vectors. The operations also include determining fused feature vectors based on the first set of weighted feature vectors and the second set of weighted feature vectors. The operations also include determining vehicle control instructions for a vehicle based on the fused feature vectors.

In a twenty-fourth aspect, in combination with the twenty-third aspect, determining the first set of weighted feature vectors may include determining, for feature values from the first set of feature vectors, higher weights to features that are located closer to the vehicle and determining, for feature values from the second set of feature vectors, higher weights to features that are located further from the vehicle.

In a twenty-fifth aspect, in combination with one or more of the twenty-third aspect through the twenty-fourth aspect, the fused feature vectors are determined based on a transformer attention process that receives the first set of weighted feature vectors and the second set of weighted feature vectors.

In a twenty-sixth aspect, in combination with the twenty-fifth aspect, the second set of weighted feature vectors are provided as query vectors to the transformer attention process and the first set of weighted feature vectors are provided as key vectors to the transformer attention process.

A twenty-seventh aspect includes a vehicle that includes near-field image sensors and far-field image sensors. The vehicle also includes a memory storing processor-readable code and at least one processor coupled to the memory. The at least one processor configured to execute the processor-readable code to cause the at least one processor to perform operations including receiving a first plurality of images captured by near-field image sensors and a second plurality of images captured by far-field image sensors. The operations also include determining a first set of feature vectors for the first plurality of images and a second set of feature vectors from the second plurality of images. The operations also include determining a first set of weighted feature vectors based on spatial locations for features from the first set of feature vectors and the second set of feature vectors. The operations also include determining a second set of weighted feature vectors based on corresponding features between the first set of feature vectors and the second set of feature vectors. The operations also include determining fused feature vectors based on the first set of weighted feature vectors and the second set of weighted feature vectors. The operations also include determining vehicle control instructions for a vehicle based on the fused feature vectors.

In a twenty-eighth aspect, in combination with the twenty-seventh aspect, determining the first set of weighted feature vectors may include determining, for feature values from the first set of feature vectors, higher weights to features that are located closer to the vehicle and determining, for feature values from the second set of feature vectors, higher weights to features that are located further from the vehicle.

In a twenty-ninth aspect, in combination with one or more of the twenty-seventh aspect through the thirtieth aspect, the fused feature vectors are determined based on a transformer attention process that receives the first set of weighted feature vectors and the second set of weighted feature vectors.

In a thirtieth aspect, in combination with the twenty-ninth aspect, the second set of weighted feature vectors are provided as query vectors to the transformer attention process and the first set of weighted feature vectors are provided as key vectors to the transformer attention process.

Components, the functional blocks, and the modules described herein with respect to FIGS. 1-4 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for image processing for use in a vehicle assistance system, comprising:

receiving a first plurality of images captured by near-field image sensors and a second plurality of images captured by far-field image sensors;

determining a first set of feature vectors from the first plurality of images and a second set of feature vectors from the second plurality of images;

determining a first set of weighted feature vectors based on spatial locations for features from the first set of feature vectors and the second set of feature vectors;

determining a second set of weighted feature vectors based on corresponding features between the first set of feature vectors and the second set of feature vectors;

determining fused feature vectors based on the first set of weighted feature vectors and the second set of weighted feature vectors; and controlling a vehicle based on the fused feature vectors.

2. The method of claim 1, wherein determining the first set of weighted feature vectors comprises:

determining, for feature values from the first set of feature vectors, higher weights to features that are located closer to the vehicle; and determining, for feature values from the second set of feature vectors, higher weights to features that are located further from the vehicle.

3. The method of claim 1, wherein determining the second set of weighted feature vectors comprises determining sets of corresponding features between the feature vectors, wherein each set of corresponding features identifies at least two feature values from at least two feature vectors located in the same or similar location.

4. The method of claim 3, wherein each of at least a subset of the sets of corresponding features is used to determine a corresponding feature value of the second set of weighted feature vectors.

5. The method of claim 1, wherein determining the second set of weighted feature vectors comprises determining weighted feature values based on feature values for corresponding features.

6. The method of claim 5, wherein the weighted feature values are determined using a pixel adaptive convolution process.

7. The method of claim 1, wherein the fused feature vectors are determined based on a transformer attention process that receives the first set of weighted feature vectors and the second set of weighted feature vectors.

8. The method of claim 7, wherein the second set of weighted feature vectors are provided as query vectors to the transformer attention process and the first set of weighted feature vectors are provided as key vectors to the transformer attention process.

9. The method of claim 8, wherein the fused feature vectors are determined based on output values from the transformer attention process.

10. The method of claim 1, wherein the feature vectors from the first plurality of images and the second plurality of images are identified by an encoder model.

11. The method of claim 1, further comprising determining spatial locations of the first and second sets of feature vectors within a physical area surrounding a vehicle.

12. The method of claim 11, wherein the spatial locations are determined as part of a top view of the physical area surrounding the vehicle.

13. The method of claim 11, wherein the spatial locations specify a distance from the vehicle and an angular offset from a heading of the vehicle for corresponding features.

14. The method of claim 1, further comprising:
determining, based on the fused feature vectors, a top view segmentation map of an area surrounding the vehicle,
wherein the vehicle control instructions are determined based on the top view segmentation map.

15. An apparatus, comprising:
a memory storing processor-readable code; and
at least one processor coupled to the memory, the at least one processor configured to execute the processor-readable code to cause the at least one processor to perform operations including:
receiving a first plurality of images captured by near-field image sensors and a second plurality of images captured by far-field image sensors;
determining a first set of feature vectors from the first plurality of images and a second set of feature vectors from the second plurality of images;
determining a first set of weighted feature vectors based on spatial locations for features from the first set of feature vectors and the second set of feature vectors;
determining a second set of weighted feature vectors based on corresponding features between the first set of feature vectors and the second set of feature vectors;
determining fused feature vectors based on the first set of weighted feature vectors and the second set of weighted feature vectors; and
controlling a vehicle based on the fused feature vectors.

16. The apparatus of claim 15, wherein determining the first set of weighted feature vectors comprises:
determining, for feature values from the first set of feature vectors, higher weights to features that are located closer to the vehicle; and
determining, for feature values from the second set of feature vectors, higher weights to features that are located further from the vehicle.

17. The apparatus of claim 15, wherein determining the second set of weighted feature vectors comprises determining weighted feature values based on feature values for corresponding features.

18. The apparatus of claim 17, wherein the weighted feature values are determined using a pixel adaptive convolution process.

19. The apparatus of claim 15, wherein the fused feature vectors are determined based on a transformer attention process that receives the first set of weighted feature vectors and the second set of weighted feature vectors.

20. The apparatus of claim 19, wherein the second set of weighted feature vectors are provided as query vectors to the transformer attention process and the first set of weighted feature vectors are provided as key vectors to the transformer attention process.

21. The apparatus of claim 20, wherein the fused feature vectors are determined based on output values from the transformer attention process.

22. The apparatus of claim 15, wherein the operations further comprise:
determining, based on the fused feature vectors, a top view segmentation map of an area surrounding the vehicle,
wherein the vehicle control instructions are determined based on the top view segmentation map.

23. A non-transitory computer-readable medium storing instructions that, when executed by a processor, cause the processor to perform operations comprising:
receiving a first plurality of images captured by near-field image sensors and a second plurality of images captured by far-field image sensors;
determining a first set of feature vectors from the first plurality of images and a second set of feature vectors from the second plurality of images;
determining a first set of weighted feature vectors based on spatial locations for features from the first set of feature vectors and the second set of feature vectors;
determining a second set of weighted feature vectors based on corresponding features between the first set of feature vectors and the second set of feature vectors;
determining fused feature vectors based on the first set of weighted feature vectors and the second set of weighted feature vectors; and
controlling a vehicle based on the fused feature vectors.

24. The non-transitory, computer-readable medium of claim 23, wherein determining the first set of weighted feature vectors comprises:
determining, for feature values from the first set of feature vectors, higher weights to features that are located closer to the vehicle; and
determining, for feature values from the second set of feature vectors, higher weights to features that are located further from the vehicle.

25. The non-transitory, computer-readable medium of claim 23, wherein the fused feature vectors are determined based on a transformer attention process that receives the first set of weighted feature vectors and the second set of weighted feature vectors.

26. The non-transitory, computer-readable medium of claim 25, wherein the second set of weighted feature vectors are provided as query vectors to the transformer attention process and the first set of weighted feature vectors are provided as key vectors to the transformer attention process.

27. A vehicle, comprising:
near-field image sensors;
far-field image sensors;
a memory storing processor-readable code; and
at least one processor coupled to the memory, the at least one processor configured to execute the processor-readable code to cause the at least one processor to perform operations including:
receiving a first plurality of images captured by the near-field image sensors and a second plurality of images captured by the far-field image sensors;

determining a first set of feature vectors from the first plurality of images and a second set of feature vectors from the second plurality of images;

determining a first set of weighted feature vectors based on spatial locations for features from the first set of feature vectors and the second set of feature vectors;

determining a second set of weighted feature vectors based on corresponding features between the first set of feature vectors and the second set of feature vectors;

determining fused feature vectors based on the first set of weighted feature vectors and the second set of weighted feature vectors; and controlling the vehicle based on the fused feature vectors.

28. The vehicle of claim 27, wherein determining the first set of weighted feature vectors comprises:

determining, for feature values from the first set of feature vectors, higher weights to features that are located closer to the vehicle; and determining, for feature values from the second set of feature vectors, higher weights to features that are located further from the vehicle.

29. The vehicle of claim 27, wherein the fused feature vectors are determined based on a transformer attention process that receives the first set of weighted feature vectors and the second set of weighted feature vectors.

30. The vehicle of claim 29, wherein the second set of weighted feature vectors are provided as query vectors to the transformer attention process and the first set of weighted feature vectors are provided as key vectors to the transformer attention process.

* * * * *